US012668060B2

(12) United States Patent
Tajima

(10) Patent No.: US 12,668,060 B2
(45) Date of Patent: Jun. 30, 2026

(54) LIQUID EJECTION HEAD AND LIQUID EJECTION APPARATUS

(71) Applicant: CANON KABUSHIKI KAISHA, Tokyo (JP)

(72) Inventor: Hiroki Tajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 18/230,285

(22) Filed: Aug. 4, 2023

(65) Prior Publication Data

US 2024/0051294 A1 Feb. 15, 2024

(30) Foreign Application Priority Data

Aug. 9, 2022 (JP) ................................. 2022-127254

(51) Int. Cl.
*B41J 2/175* (2006.01)
*B41J 2/14* (2006.01)

(52) U.S. Cl.
CPC ........... *B41J 2/175* (2013.01); *B41J 2/14209* (2013.01); *B41J 2/17509* (2013.01); *B41J 2/1753* (2013.01); *B41J 2/17556* (2013.01)

(58) Field of Classification Search
CPC .... B41J 2/175; B41J 2/14209; B41J 2/17509; B41J 2/1753; B41J 2/17556
See application file for complete search history.

(56) References Cited

U.S. PATENT DOCUMENTS 4,714,937 A * 12/1987 Kaplinsky ............... B41J 2/175 347/86
6,733,117 B2 5/2004 Tajima et al.

FOREIGN PATENT DOCUMENTS

JP 2002-307712 A 10/2002

* cited by examiner

*Primary Examiner* — Geoffrey S Mruk
(74) *Attorney, Agent, or Firm* — Venable LLP

(57) ABSTRACT

A liquid ejection head includes an ejection port configured to eject liquid, a liquid reservoir portion configured to supply the liquid to the ejection port, and a pressure adjustment chamber configured to communicate with the liquid reservoir portion. The pressure adjustment chamber includes an elastic deformation portion configured so that an inner volume thereof can be changed according to a gas pressure and a support portion configured to support the elastic deformation portion on the liquid reservoir portion. An area between the elastic deformation portion and the support portion has higher rigidity than the elastic deformation portion.

14 Claims, 12 Drawing Sheets

LIQUID EJECTION HEAD AND LIQUID EJECTION APPARATUS

BACKGROUND OF THE INVENTION

Field of the Invention

The present disclosure relates to a liquid ejection head and a liquid ejection apparatus.

DESCRIPTION OF THE RELATED ART

Some liquid ejection heads for ejecting liquid such as ink are equipped with a liquid reservoir portion for reserving or storing a certain amount of liquid. In Japanese Patent Laid-Open No. 2002-307712 (hereinafter referred to as Document 1), a configuration equipped with a sub-tank in a print head is described. Document 1 discloses a configuration in which a pressure adjustment chamber employing an elastic deformation member is disposed on an upper surface of the print head in order to adjust the gas pressure of a sub-tank in the print head. The elastic deformation member of Document 1 has two surfaces that are flat in the state before deformation and has a shape in which the two surfaces are continuous at the leading end portion via curved surface portions. It is described that this stabilizes the deformation of the elastic member and thus the pressure adjustment performed by the pressure adjustment chamber is stabilized.

There is a demand for further stabilization of the pressure adjustment in a liquid reservoir portion in a liquid ejection head.

SUMMARY OF THE INVENTION

A liquid ejection head according to an embodiment of the present disclosure includes an ejection port configured to eject liquid, a liquid reservoir portion configured to supply the liquid to the ejection port, and a pressure adjustment chamber configured to communicate with the liquid reservoir portion, wherein the pressure adjustment chamber includes an elastic deformation portion configured so that an inner volume thereof can be changed according to a gas pressure and a support portion configured to support the elastic deformation portion on the liquid reservoir portion, and wherein an area between the elastic deformation portion and the support portion has higher rigidity than the elastic deformation portion.

Further features of the present invention will become apparent from the following description of exemplary embodiments with reference to the attached drawings.

DESCRIPTION OF THE EMBODIMENTS

Hereinafter, a detailed explanation is given of preferable embodiments of the present disclosure with reference to the accompanying drawings. Note that the following embodiments are not intended to limit the contents of the present disclosure, and every combination of the characteristics explained in the present embodiments is not necessarily essential to the solution in the present disclosure. The same reference numbers are given to the same constituent elements.

First Embodiment

<Configuration of the Liquid Ejection Apparatus>

Figure 1:
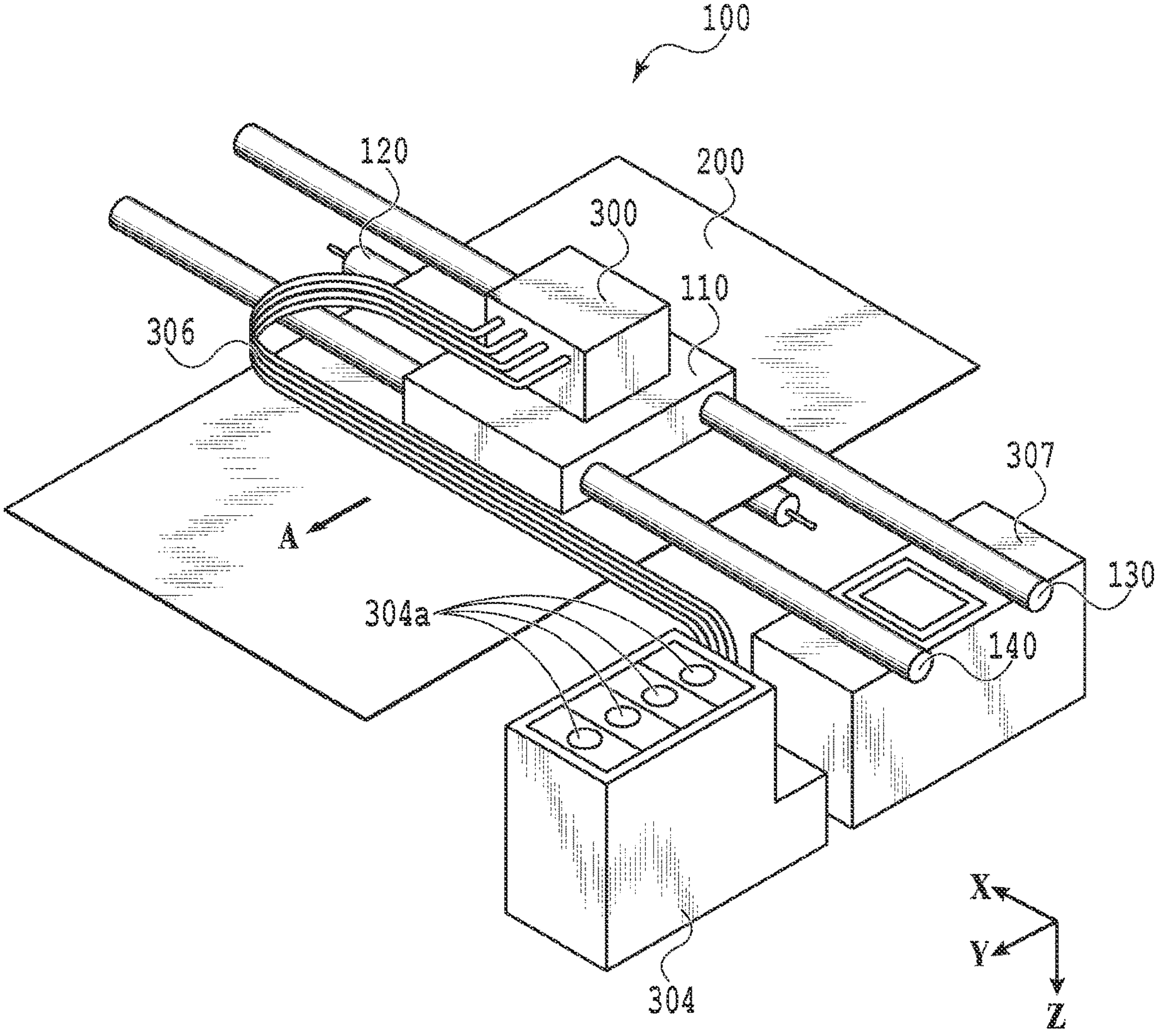
FIG. 1 is a schematic view of a liquid ejection apparatus.

FIG. 1 is a schematic view of the liquid ejection apparatus 100. The liquid ejection apparatus 100 according to the present embodiment has the liquid ejection head 300 that ejects liquid. The liquid ejection head 300 of the present embodiment is a print head that performs printing by ejecting liquid ink. That is, the liquid ejection apparatus 100 of the present embodiment is an inkjet printing apparatus. The liquid ejection apparatus is not limited to an inkjet printing apparatus and may be any apparatus that ejects a given liquid.

The liquid ejection apparatus 100 has the carriage 110, the paper conveyance roller 120, the supply tube 306, the recovery unit 307, the first shaft 130, the second shaft 140, the liquid ejection head 300, and the main tank 304. The paper conveyance roller 120 rotates to convey the paper 200 in the paper feeding direction A. The liquid ejection head 300 which is fixed to the carriage 110 performs printing on the paper 200 while reciprocating along the first shaft 130 and the second shaft 140 in synchronization with paper conveyance. The liquid ejection head 300 and the main tank 304 are connected via the supply tube 306. The liquid ejection head 300 is supplied with ink from the main tank 304 through the supply tube 306. In a case where printing is not performed, the liquid ejection head 300 stands by at the position of the recovery unit 307 in a state where the ejection ports of the liquid ejection head 300 are sealed with a cap. Although the liquid ejection apparatus 100 of the present embodiment includes the main tank and supply tube 306 for four colors and the liquid ejection head 300 that ejects ink of each color in the illustrated example, the number of ink colors is not limited to four. The main tank 304 is equipped with the liquid injection ports 304*a* for the respective ink colors so that the user can refill the main tank 304 with inks in a case where the amounts of inks in the main tank 304 are low.

Figure 2:
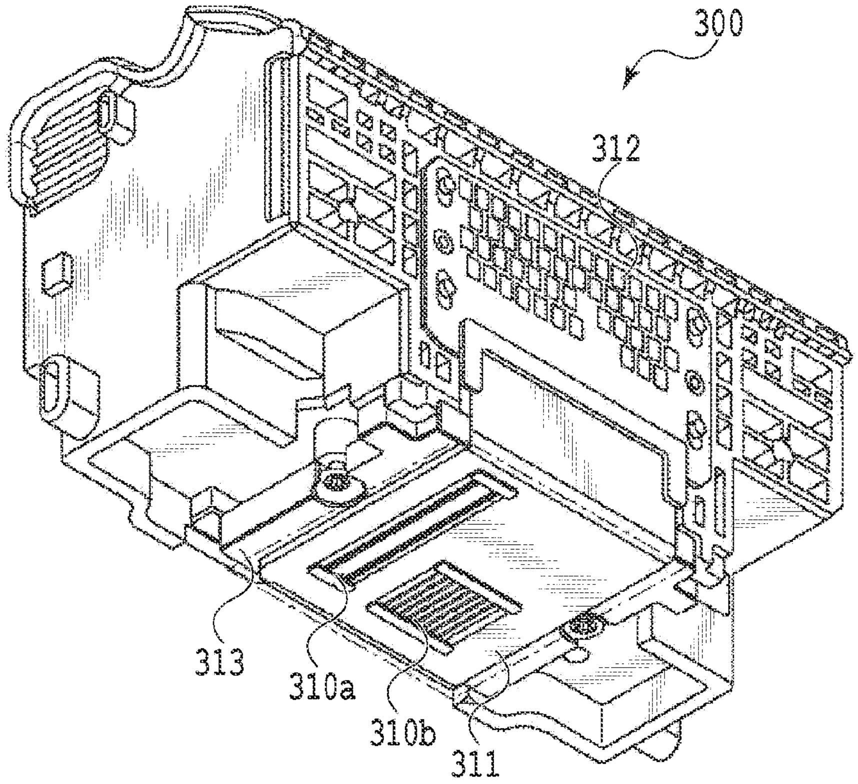
FIG. 2 is a schematic view of a liquid ejection head.

FIG. 2 is a schematic view of the liquid ejection head 300. The liquid ejection head 300 includes the first liquid ejection portion 310*a* (mainly for black) and the second liquid ejection portion 310*b* (mainly for colors) that eject ink for printing. The support member 313 that supports the liquid ejection portions is fixed to the liquid ejection head 300. The electric wiring tape 311 is connected to the support member 313 for sending electric signals to the liquid ejection portions, and the electric wiring tape 311 is connected to the electric connection substrate 312. The electric connection substrate 312 transmits electric signals to each liquid ejection portion via the electric wiring tape 311.

Figure 3:
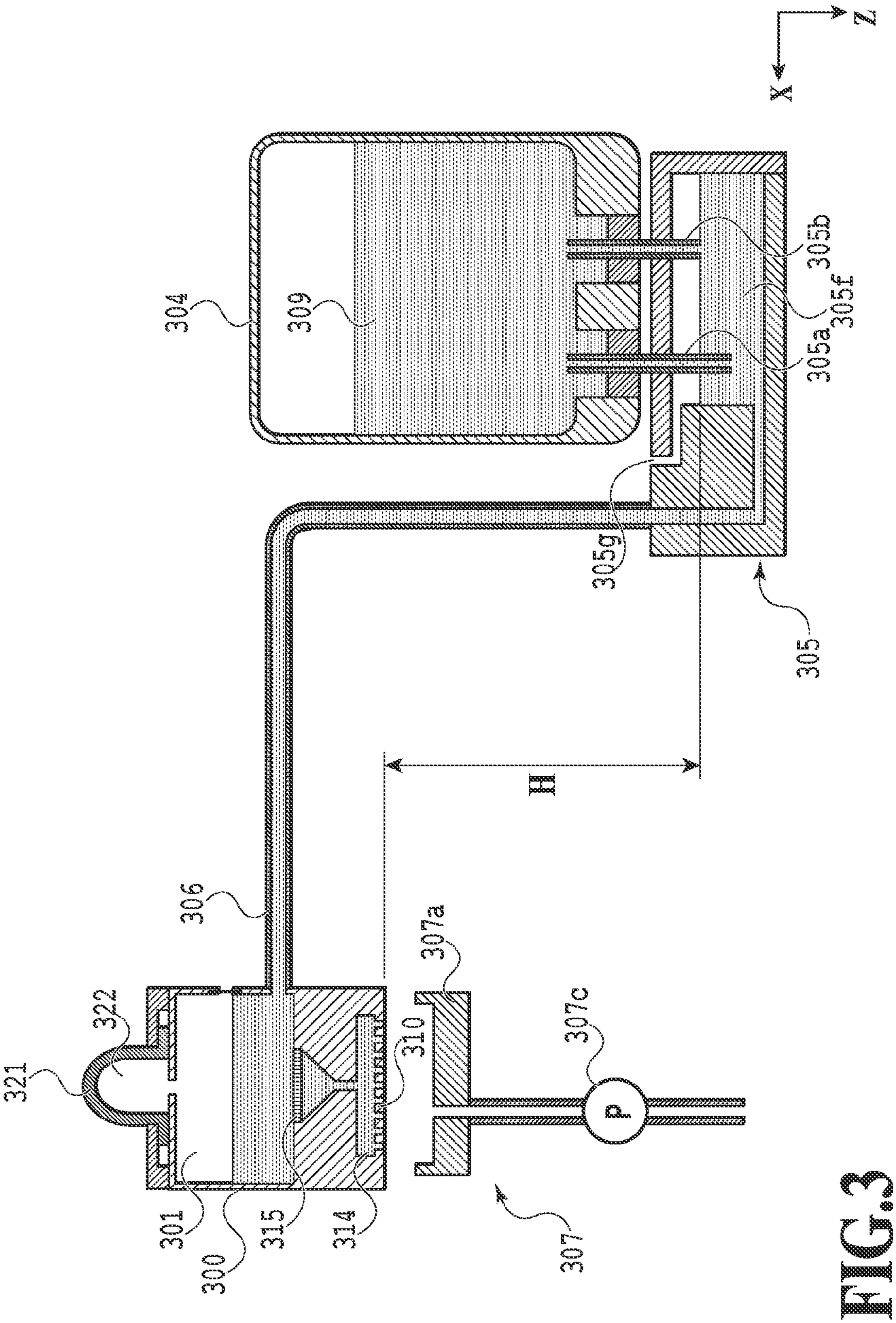
FIG. 3 is a schematic view illustrating a main tank and the liquid ejection head.

FIG. 3 is a schematic view illustrating the main tank 304 and the liquid ejection head 300. In FIG. 3, the configuration of ink for one color is illustrated as an example. The ink 309 is supplied from the main tank 304 to the liquid ejection head 300. The liquid ejection head 300 includes the liquid reservoir portion 301 for temporarily reserving or storing a certain amount of ink. The elastic deformation member 321, which forms the pressure adjustment chamber 322 that absorbs sudden pressure changes inside the liquid reservoir portion 301 to adjust the pressure inside the liquid reservoir portion 301, is attached to the upper surface of the liquid ejection head 300.

In the present specification, the pressure adjustment chamber 322 that employs the elastic deformation member 321, which is not according to the present embodiment, is explained first as a comparative example, and then an explanation is given of employing the elastic deformation member 421 (FIG. 8A and FIG. 8B) of the present embodiment. The details are described later, and the overall configuration of the apparatus is explained first.

The supply unit 305 internally has the liquid chamber 305*f*. The liquid chamber 305*f* is open to the atmosphere through the air port 305*g* and is connected to the supply tube 306 at the bottom of the liquid chamber 305*f*. The hollow ink supply needle 305*a* and air introducing needle 305*b* are fixed to the supply unit 305 so that the respective bottoms thereof are positioned inside the liquid chamber 305*f* and the tops thereof protrude from the upper surface of the supply unit 305. The bottom of the ink supply needle 305*a* is positioned lower than the bottom of the air introducing needle 305*b*.

The ink in the main tank 304 is supplied to the liquid chamber 305*f* via the ink supply needle 305*a*, and the atmosphere is introduced into the main tank 304 via the air introducing needle 305*b* so as to compensate for the decrease in the pressure inside the main tank 304 due to the supply. If the ink is supplied into the liquid chamber 305*f* up to the position where the bottom of the air introducing needle 305*b* is immersed in the ink, the atmosphere is no longer introduced into the main tank 304, and thus the supply of ink from the main tank 304 to the liquid chamber 305*f* is stopped.

The liquid ejection head 300 has a channel that connects the liquid reservoir portion 301 and the liquid ejection portion 310. In the liquid ejection portion 310, the open face of the ejection ports faces downward, so that the ink is ejected downward. An energy generating element is disposed in each ejection port of the liquid ejection portion 310. The liquid reservoir portion 301 is positioned above the liquid ejection portion 310. The filter 315 with a fine mesh structure is attached between the liquid reservoir portion 301 and the channel 314 to suppress clogging of the ejection ports, which is caused by fine foreign substances in the ink invading the liquid ejection portion 310.

The ejection ports of the liquid ejection portion 310 are open to the atmosphere, and the open face is arranged so as to face downward. The inside of the liquid ejection head 300 must be kept at a negative pressure in order to suppress ink leakage from the ejection ports. On the other hand, if the negative pressure is too high, air invades the ejection ports, which makes it impossible to eject ink from the ejection ports. Therefore, in order to create a proper negative pressure state in the liquid ejection head 300, the liquid ejection head 300 is arranged so that the position of the open face of the ejection ports is located at a position higher by the height H than the liquid surface of the ink in the liquid chamber 305*f*. Accordingly, the inside of the liquid ejection head 300 is kept to the state with a negative pressure corresponding to the water head difference of the height H. With the configuration above, the ejection ports are kept filled with ink in the state where meniscuses are formed on the open face.

The ejection of ink from the ejection ports is performed by driving the energy generating elements to push out the ink in the ejection ports. After the ink is ejected, the inside of the ejection ports is filled with ink by capillary force. During printing operations, ejection of ink from the ejection ports and filling of the ejection ports with ink are repeated, and ink is sucked up from the liquid chamber 305*f* via the supply tube 306 at any time.

The recovery unit 307 has the cap 307*a*, which caps the open face of the ejection ports of the liquid ejection head 300, and the suction pump 307*c*, which is connected to the cap 307*a*. The suction pump 307*c* is driven in the state where the open face of the ejection ports is capped with the cap 307*a* so that the ink in the liquid ejection head 300 is forcibly suctioned, and thus thickened matters and excess bubbles of ink can be thereby removed from the liquid ejection portion 310.

Figure 4:
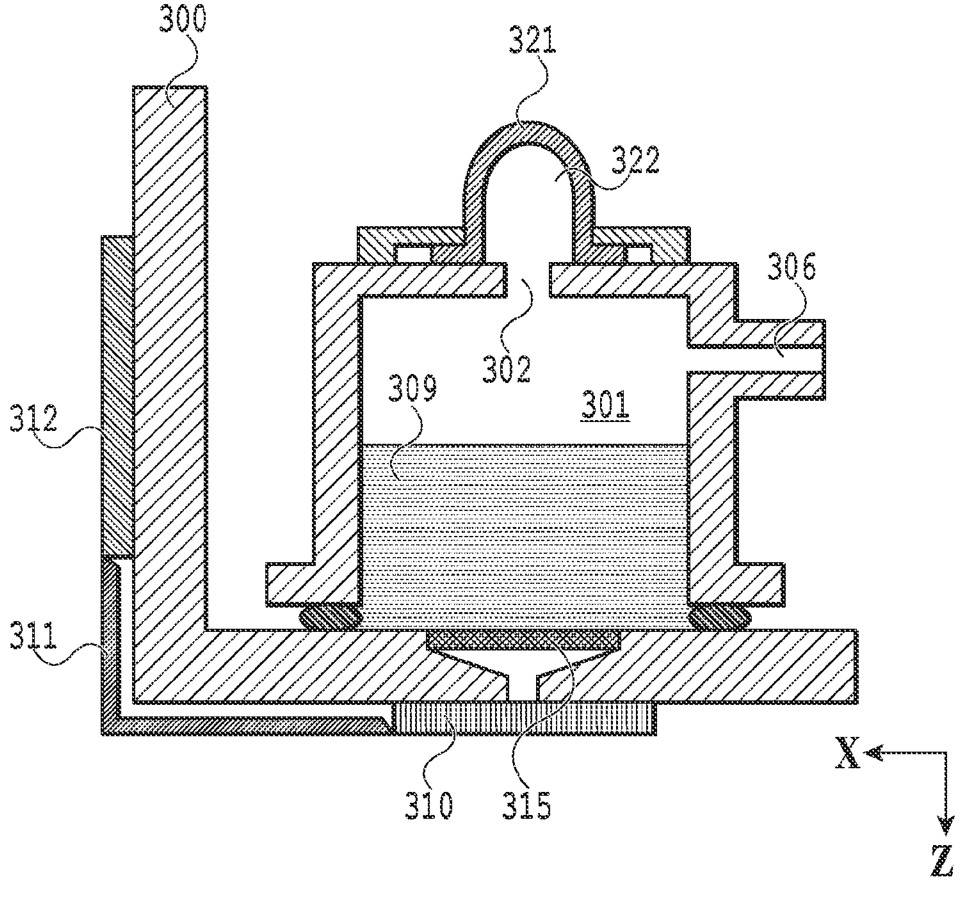
FIG. 4 is an enlarged schematic view of the liquid ejection head.

FIG. 4 is an enlarged schematic view of the liquid ejection head 300. FIG. 5A to FIG. 5C and FIG. 6A and FIG. 6B are diagrams illustrating the configuration of the elastic deformation member 321, which is not according to the present embodiment, as a comparative example. First, as a comparative example, an explanation is given of a configuration employing the elastic deformation member 321 with reference to FIG. 4 to FIG. 6A and FIG. 6B. As described above, the liquid ejection head 300 includes the liquid reservoir portion 301 for temporarily reserving or storing a certain amount of ink 309. The elastic deformation member 321, which forms the pressure adjustment chamber 322 that absorbs sudden pressure changes inside the liquid reservoir portion 301 to adjust the pressure inside the liquid reservoir portion 301, is attached to the upper surface of the liquid ejection head 300. The elastic deformation member 321 is formed of an elastic member such as rubber. The pressure adjustment chamber 322 communicates with the inside of the liquid reservoir portion 301 via the opening portion 302 formed in the upper wall of the liquid ejection head 300. As the elastic deformation member 321 deforms according to pressure change inside the liquid reservoir portion 301, the inner volume of the pressure adjustment chamber 322 changes so as to absorb the pressure change inside the liquid reservoir portion 301.

Figure 5A:
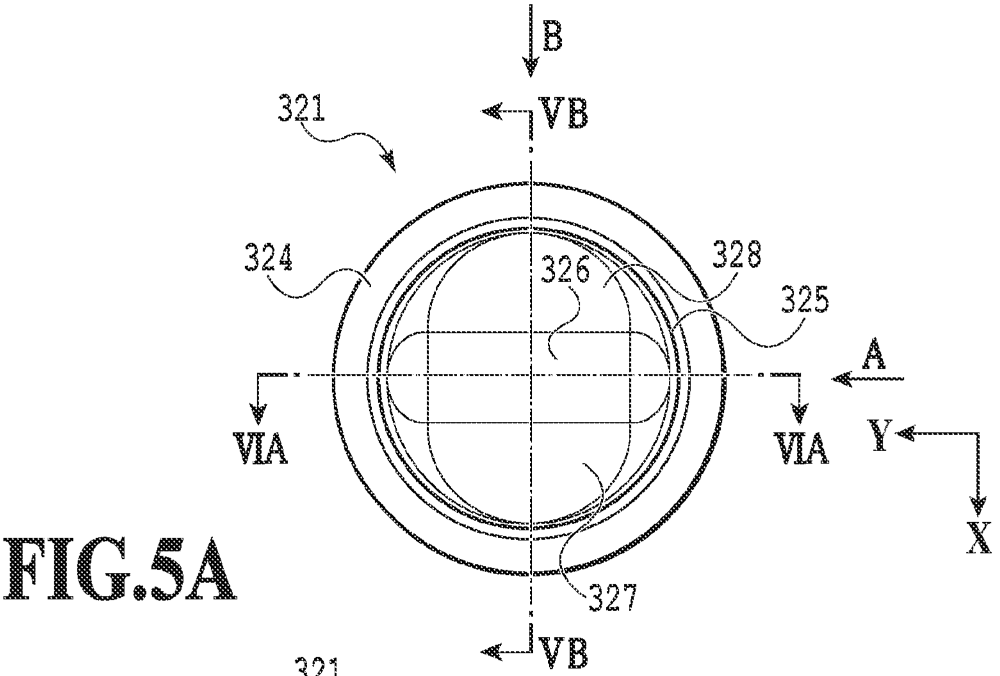
FIG. 5A to FIG. 5C are diagrams illustrating the configuration of an elastic deformation member.
Figure 5B:
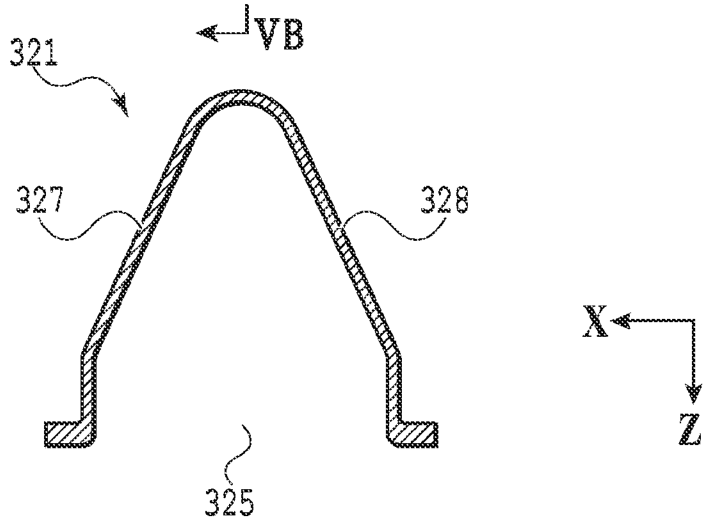
Figure 5C:
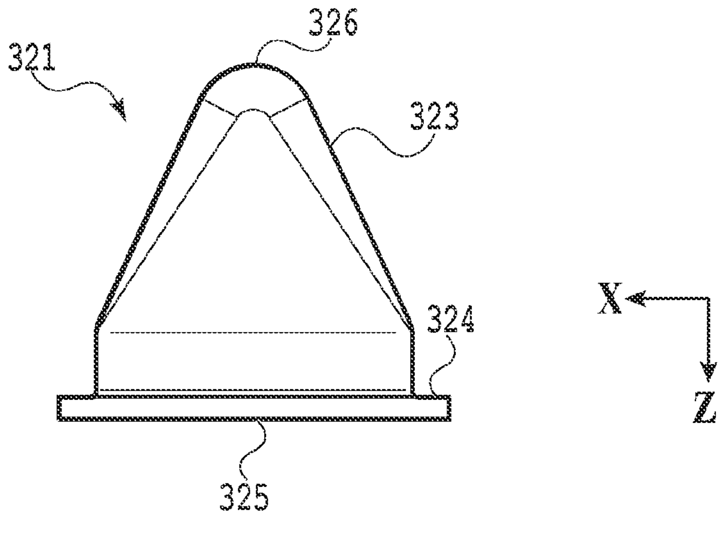
Figure 6A:
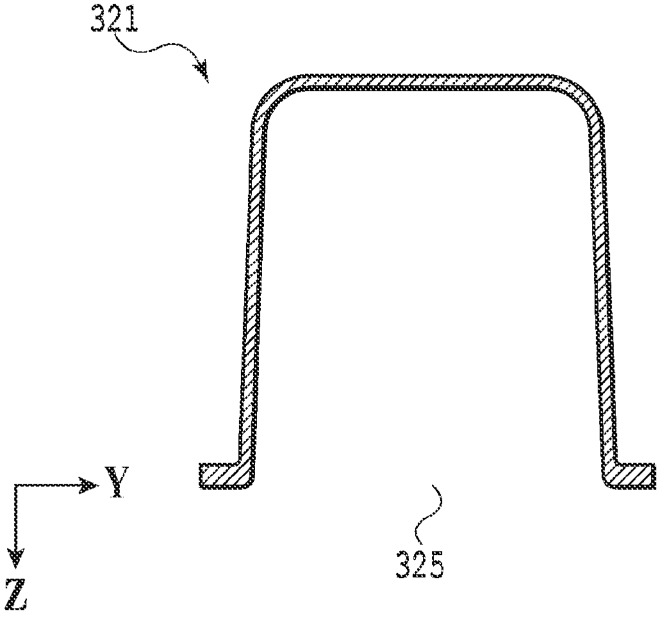
FIG. 6A and FIG. 6B are diagrams illustrating the configuration of the elastic deformation member.
Figure 6B:
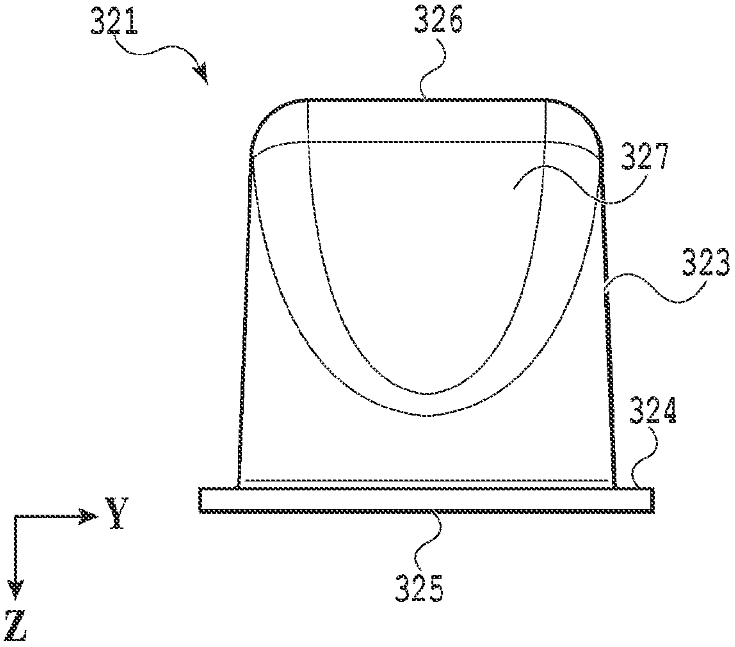

FIG. 5A to FIG. 5C and FIG. 6A and FIG. 6B are diagrams in which the elastic deformation member 321 is extracted. FIG. 5A is a top view of the elastic deformation member. FIG. 5B is a cross-sectional view taken along Line VB-VB of FIG. 5A. FIG. 5C is an external view seen from the direction of Arrow A of FIG. 5A. FIG. 6A is a cross-sectional view taken along Line VIA-VIA of FIG. 5A. FIG. 6B is an external view seen from the direction of Arrow B of FIG. 5A.

As illustrated in FIG. 5A to FIG. 5C and FIG. 6A and FIG. 6B, the elastic deformation member 321 includes at least one deformable elastic deformation portion 323 and the support portion 324 for supporting the elastic deformation portion 323 on the liquid reservoir portion 301. The elastic deformation portion 323 has the one opening portion 325 in a circular shape and the two surfaces 327 and 328 that are flat in the state before deformation. Further, the elastic deformation portion 323 has the leading end portion 326 which is disposed on the opposite side of the opening portion 325 and whose front surface is a curved surface. The two flat surfaces 327 and 328 are disposed so as to be symmetrical about a straight line passing through the center of the bottom face of the opening portion 325. The two flat surfaces 327 and 328 are connected via the leading end portion 326 extending in a straight line parallel to the opening portion 325 and have a shape in which the distance between the flat surfaces gradually decreases toward the leading end portion 326. Further, the elastic deformation member 321 is configured to have a small thickness because of the need for sensitivity to adjust minute fluctuations in internal pressure caused by the movement of the carriage 110. The elastic deformation portion 323 is configured to have a cylindrical curved surface (a curved surface corresponding to the outer rim of the cylindrical tube). R portions are formed between the cylindrical curved surface and the two flat surfaces 327 and 328 and between the leading end portion 326 and the two flat surfaces 327 and 328. The elastic deformation portion 323 is formed with a sealed space on the inside so that the pressure adjustment chamber 322 is configured.

FIG. 7A to FIG. 7D are schematic views illustrating an example of adjusting the pressure in the case of employing the elastic deformation member 321 of the comparative example. Although, for convenience, the direction of the channel toward the filter 315 in the illustrated example is different from the example of FIG. 3 and FIG. 4, the following explanation contents are similarly applied even though the channel toward the filter 315 is formed to be downward in the drawings.

If such an elastic deformation member with no flat surface on the outer peripheral surface is employed, positions to be initially crushed are not constant and crushed shapes are not constant either, and thus characteristics of the negative pressure in the pressure adjustment chamber are not stable as well.

Figures 7A, 7B, 7C, 7D:
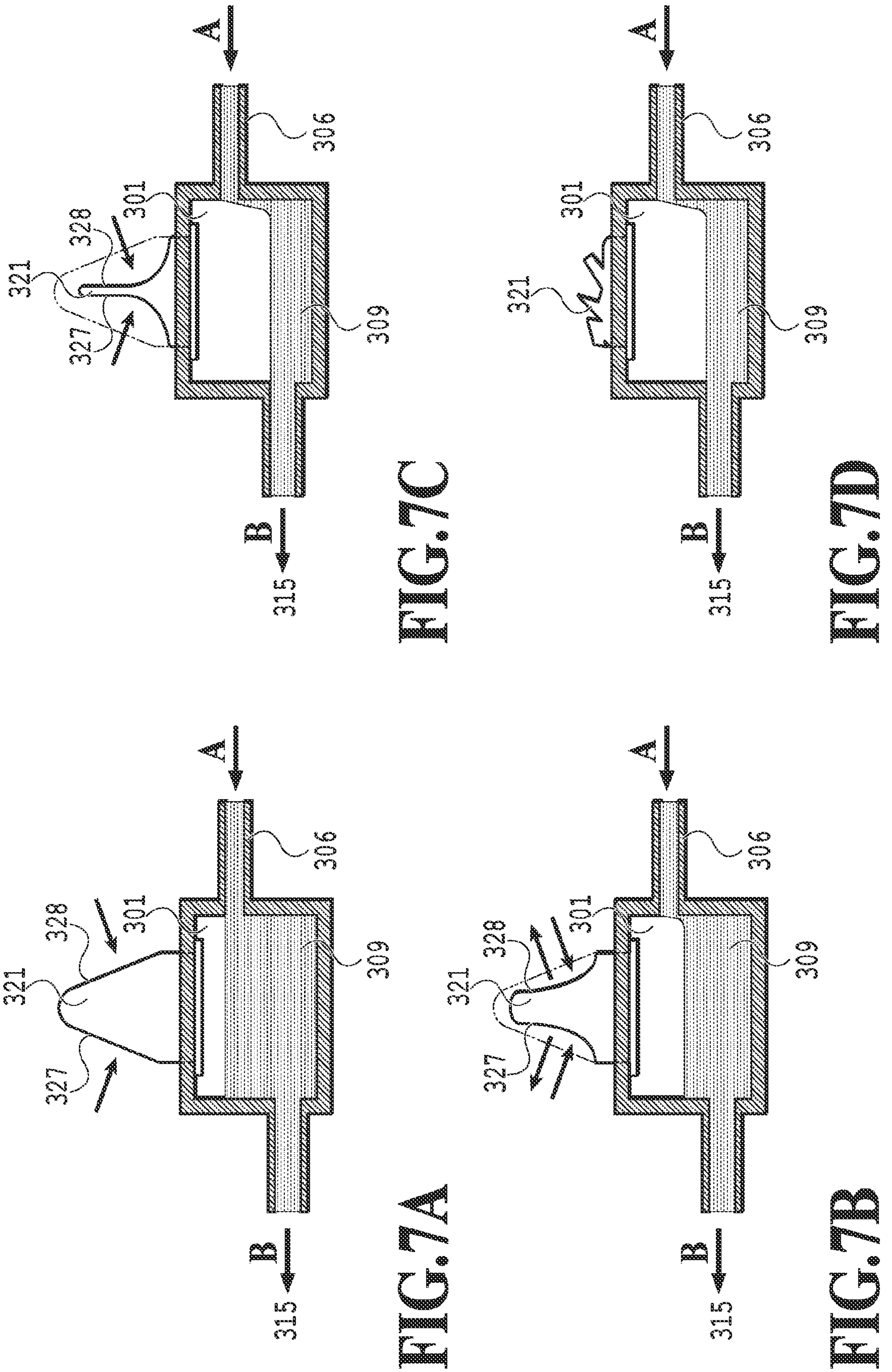
FIG. 7A to FIG. 7D are schematic views illustrating an example of adjusting a pressure.

On the other hand, since the elastic deformation member 321 illustrated in the comparative example has the two flat surfaces 327 and 328, the position to be initially crushed due to a decrease in the inner volume of the pressure adjustment chamber 322 is stabilized. That is, as illustrated in FIG. 7A and FIG. 7B, the denting starts from the two flat surfaces 327 and 328 so that the approximately central portions of the two flat surfaces 327 and 328 approach each other. Since the elastic deformation member 321 illustrated in the comparative example has the two flat surfaces 327 and 328 on the outer peripheral surface, the crushing starts from the flat surfaces 327 and 328. Further, in addition to the shape of the elastic deformation member 321 crushed in an approximately constant way, the shape of restoration is approximately constant as well since the flat surfaces 327 and 328 are disposed so as to be approximately symmetrical about the leading end portion 326. Therefore, the characteristics of the negative pressure in the pressure adjustment chamber 322 are stabilized.

Further, the liquid ejection apparatus 100 of the present embodiment has a characteristic that the liquid ejection head 300, which is connected via the supply tube 306, is affected by the inertial force of the ink inside the tube due to the reciprocating operation of the carriage 110. Specifically, the inside of the liquid reservoir portion 301 is pressurized in the case where the liquid ejection head 300 accelerates in the direction of pushing the supply tube 306, and the inside of the liquid reservoir portion 301 becomes negative pressure in the case where the liquid ejection head 300 accelerates in the direction of pulling the supply tube 306. The opposite is true in the case of deceleration.

With reference to FIG. 7A to FIG. 7D, an explanation is given of the behavior of the elastic deformation member 321. In FIG. 7A, the appearance in a case of a stationary state or a state in which the ink 309 flows constantly, where the flow rate is A=B, is illustrated. In this state, in addition to a case of the internal pressure change due to the influence of a carriage operation as described above, in a case where the flow rate of the ink 309 becomes A<B, the inside the liquid reservoir portion 301 becomes negative pressure. Further, in addition to a case of the internal pressure change due to the influence of a carriage operation as described above, in a case where the flow rate of the ink 309 becomes A>B, the inside of the liquid reservoir portion 301 is pressurized. In this way, the inner volume inside the elastic deformation member 321 decreases or increases according to various behaviors. Therefore, the elastic deformation portion 323 becomes dented as illustrated in FIG. 7B or swells from the state of FIG. 7B to the state of FIG. 7A, so that the internal gas pressure is maintained to be a certain amount. In this way, if the amount of change in the inner volume of the elastic deformation member 321 and the gas pressure in the liquid reservoir portion 301 have a relationship with hysteresis, the responsiveness of the pressure adjustment chamber 322 to the pressure change inside the liquid reservoir portion 301 is always stable. As a result, the state of ink supply to the liquid ejection portion 310 is stabilized, and thus there is little effect on printed images.

On the other hand, in the elastic deformation member 321, as illustrated in FIG. 7C, there is a case in which the two flat surfaces stick to each other and take time to return to the original state if the inside of the liquid reservoir portion 301 temporarily turns to a negative pressure state for a reason such as an insufficient supply of ink due to an occurrence of some trouble, for example. Further, if the inside of the liquid reservoir portion 301 turns to a greater negative pressure state due to choke suction for initial ink filling or recovery of the supply system, there is a possibility that the elastic deformation member 321 itself is completely crushed and cannot return to the original state as illustrated in FIG. 7D. As a result, it may become impossible to adjust the pressure inside the liquid reservoir portion 301. The choke suction is an operation of suctioning the liquid ejection head 300 with the suction pump 307*c* in the state where the ejection port surface is capped with the cap 307*a*. By closing a valve (not illustrated in the drawings) so as to accumulate negative pressure and then opening the valve, it is possible to make the ink flow at once with the accumulated high negative pressure. Here, the inside of the liquid reservoir portion 301 becomes a great negative pressure state.

In this way, if the elastic deformation member 321 itself is completely crushed and cannot return to the original state, it becomes impossible to appropriately adjust the pressure inside the liquid reservoir portion 301, which affects the state of ink supply, and, as a result, there is a possibility that stable printing cannot be performed.

Therefore, in the present embodiment, an explanation is given of the examples employing an elastic deformation member capable of stably adjusting the pressure inside the liquid ejection head.

Figure 8A:
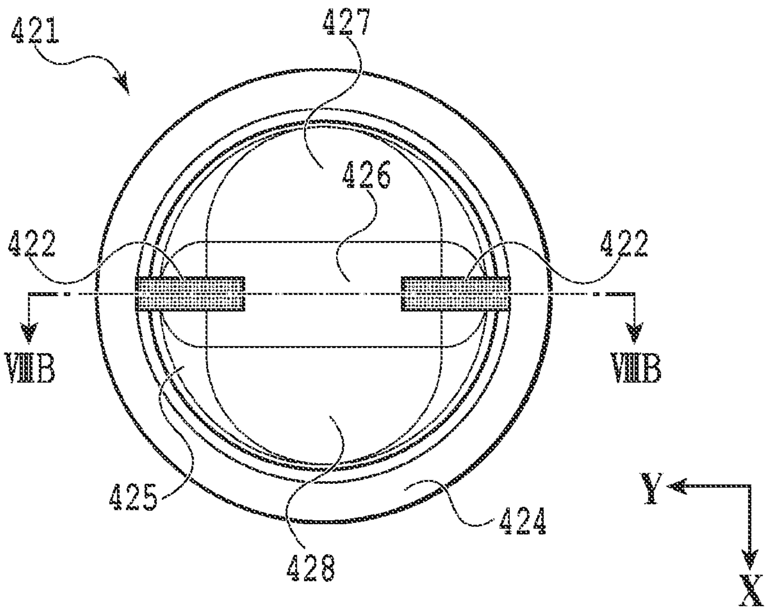
FIG. 8A and FIG. 8B are diagrams illustrating an example of an elastic deformation member.
Figure 8B:
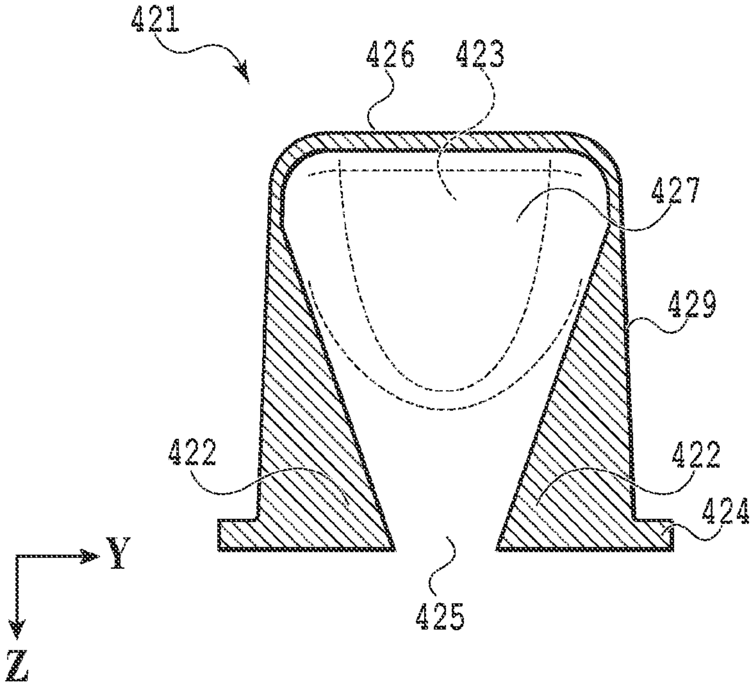

FIG. 8A and FIG. 8B are diagrams illustrating an example of the elastic deformation member 421 of the present embodiment. FIG. 8A is atop view of the elastic deformation member 421, as with FIG. 5A. FIG. 8B is a cross-sectional view taken along Line VIIIB-VIIIB of FIG. 8A. In FIG. 8B, the flat surface 427 is also illustrated as transparent. Further, FIG. 9A to FIG. 9D are schematic views illustrating an example of adjusting the pressure in the case of employing the elastic deformation member 421 of the present embodiment. FIG. 9A to FIG. 9D are diagrams corresponding to scenes similar to FIG. 7A to FIG. 7D, respectively. First, the explanation is given with reference to FIG. 8A and FIG. 8B.

The elastic deformation member 421 has the elastic deformation portion 423, the support portion 424 for supporting the elastic deformation portion 423 on the liquid reservoir portion 301, and the semi-deformation portion 429 that continuously connects the elastic deformation portion 423 and the support portion 424. The elastic deformation portion 423 has the two surfaces 427 and 428, which are flat before deformation, and the leading end portion 426, which is disposed on the opposite side of the opening portion 425 and has a curved surface. The two flat surfaces 427 and 428 are symmetrical about a straight line passing through the center of the bottom face of the opening portion 425 and are connected via the leading end portion 426 extending in a straight line parallel to the opening portion 425, and the distance between the flat surfaces gradually decreases toward the leading end portion 426.

The semi-deformation portion 429 has a curved surface that forms a part of the outer rim of a cylindrical tube extending from the opening portion 425 in a circular shape toward the leading end portion 426. The semi-deformation portion 429 is also formed of an elastic member such as rubber, for example, as with the elastic deformation portion 423. The semi-deformation portion 429 is a deformable portion although it does not deform as much as the elastic deformation portion 423 does. The semi-deformation portion 429 has the protrusions 422 that protrude inward from the inner wall of the semi-deformation portion 429. The semi-deformation portion 429 is configured to have high rigidity with the protrusions 422. That is, the semi-deformation portion 429 has the protrusions 422 which are structures that protrude from the inner wall of the semi-deformation portion 429 toward the inside of the pressure adjustment chamber 322 (the elastic deformation member 421). Therefore, even in a case where the elastic deformation portion 423 is deformed, deformation of the semi-deformation portion 429 can be suppressed. As illustrated in FIG. 8B, the left and right protrusions 422 are disposed so as to protrude further inward as they approach the opening portion 425. That is, the protrusions 422 have an approximately triangular shape in cross-sectional view. In other words, the widths of the protrusions 422 on planes parallel to the plane on which the opening portion 425 is formed are configured so as to be larger at the first position, which is closer to the opening portion 425, than at the second position, which is further away from the opening portion 425. In FIG. 8A, the protrusions 422 near the opening portion 425 are illustrated. Further, as illustrated in FIG. 8B, the protrusions 422 protrude less as they approach the leading end portion 426. This is to avoid interference with the flat surfaces 427 and 428 that prevents stable deformation. In other words, since the pressure adjustment function is deteriorated if the protrusions 422 interfere with an area (a deformable area that gets crushed or swells) of the elastic deformation portion 423 (the flat surfaces 427 and 428), the protrusions 422 are disposed so as not to interfere with the elastic deformation portion 423.

Although it is preferable that the protrusions 422 have an approximately triangular shape as illustrated in FIG. 8B, it is also possible to have an inverted triangular or quadrangle shape as long as they do not interfere with the area (the deformable area that gets crushed or swells) of the elastic deformation portion 423 (the flat surfaces 427 and 428). It is preferable that the inward protrusion amount of the protrusions 422 is approximately half the radius of the opening portion 425.

In the diagram of FIG. 8B, the elastic deformation member 421 is exemplarily illustrated in the direction corresponding to FIG. 6A and FIG. 6B, which have been described as the comparative example. Here, diagrams of the elastic deformation member 421 viewed from the direction of Arrow A of FIG. 5A would be equivalent to FIG. 5B and FIG. 5C, which have been described as the comparative example.

Figure 9A:
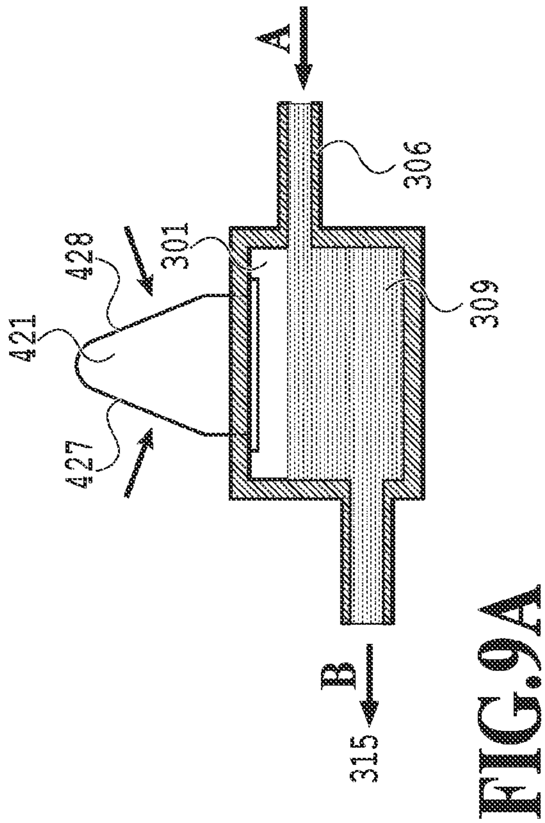
FIG. 9A to FIG. 9D are schematic views illustrating an example of adjusting a pressure.
Figure 9B:
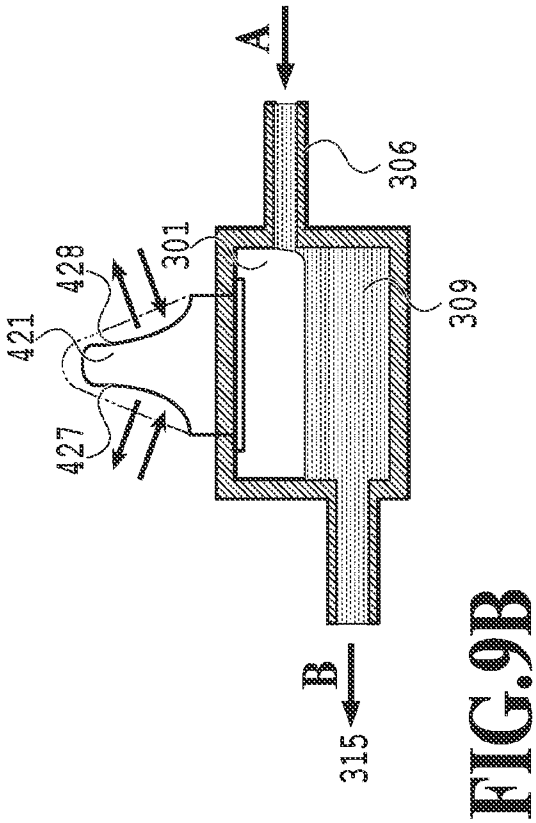
Figure 9C:
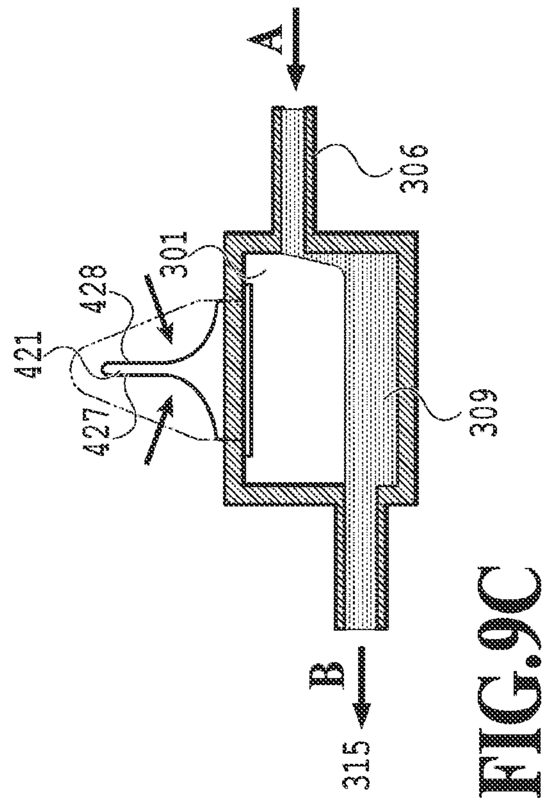
Figure 9D:
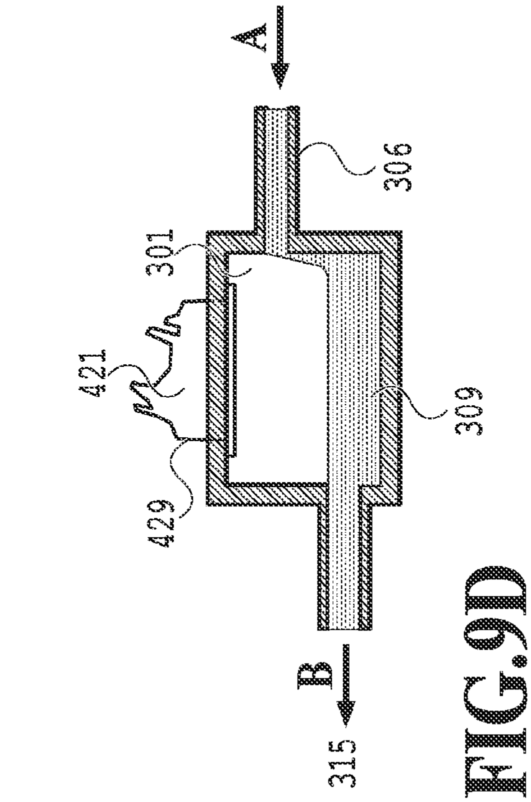

The elastic deformation portion 423 of the elastic deformation member 421 is configured with a small thickness because of the need for sensitivity to adjust minute pressure fluctuations caused by the movement of the carriage 110. Therefore, as described above, it gets completely crushed under a great negative pressure at the time of choke suction. However, since the semi-deformation portion 429 has high rigidity because of the protrusions 422 protruding inward, the elastic deformation member 421 does not get completely crushed as illustrated in FIG. 9D. Furthermore, the elastic deformation member 421 that is not completely crushed also has a reaction force for restoration, and thus it is possible to easily return to the original shape.

Figure 10A:
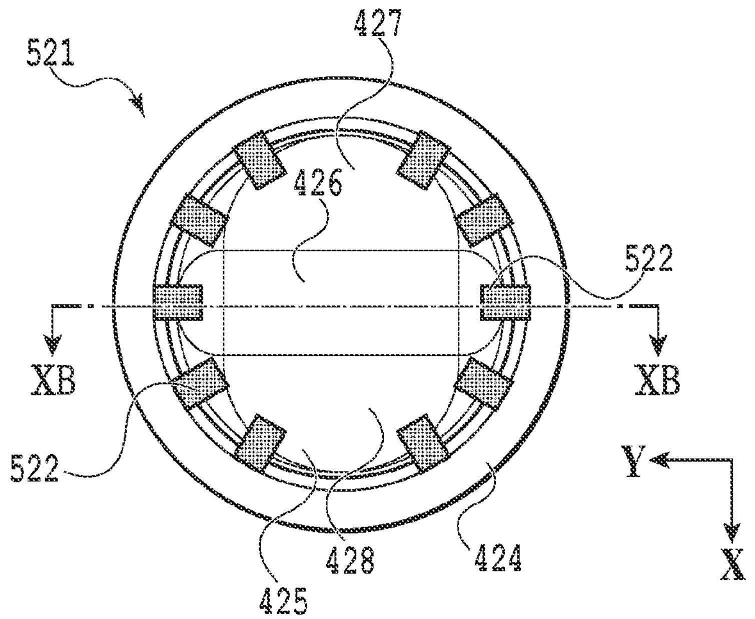
FIG. 10A and FIG. 10B are diagrams illustrating the configuration of an elastic deformation member.
Figure 10B:
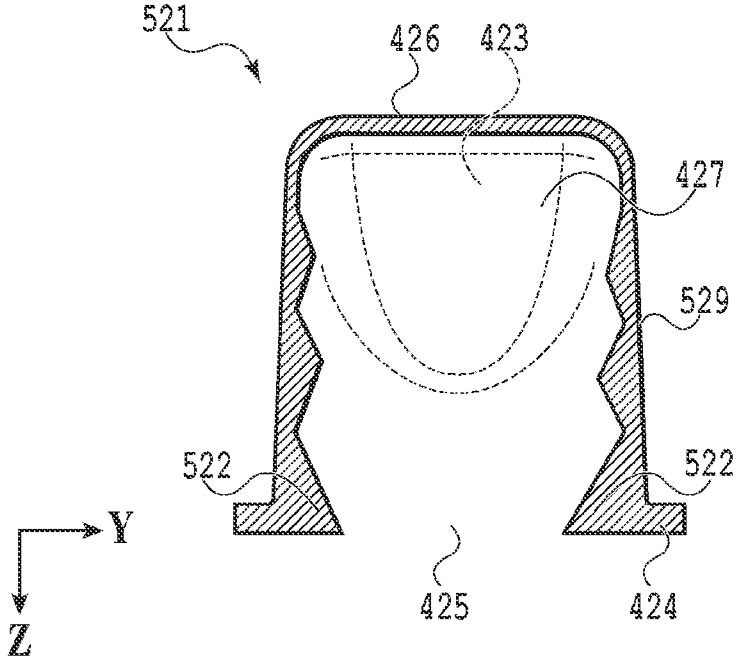

FIG. 10A and FIG. 10B are diagrams illustrating the configuration of the elastic deformation member 521 according to a modification example of the present embodiment. The same signs are attached to the configurations equivalent to those in the elastic deformation member 421 illustrated in FIG. 8A and FIG. 8B so as to omit explanations thereof. FIG. 10A and FIG. 10B are also diagrams with compositions similar to those of FIG. 8A and FIG. 8B. That is, FIG. 10A is a top view of the elastic deformation member 421, as with FIG. 8A. FIG. 10B is a cross-sectional view taken along Line XB-XB of FIG. 10A. In FIG. 10B, the flat surface 427 is also illustrated as transparent. As illustrated in FIG. 10A, the elastic deformation member 421 of the modification example has the multiple protrusions 522 along the outer rim of the opening portion 425 if viewed from above. In the example of the present diagram, there are ten protrusions 522. In the elastic deformation member 521 illustrated in FIG. 10A and FIG. 10B, the pressure adjustment function is also deteriorated if the protrusions 522 interfere with an area of the elastic deformation portion 423 (an area of the flat surfaces 427 and 428), and thus the protrusions 522 are disposed to prevent such interference. As illustrated in FIG. 10B, the respective protrusions 522 are configured so that the inward protrusion amounts become greater as they approach the support portion 524, so as to have high rigidity of the base. Further, although the inward protrusion amounts of the respective protrusions 522 are smaller than those of the protrusions 422 illustrated in FIG. 8A and FIG. 8B, a larger number of protrusions 522 are disposed than in the example illustrated in FIG. 8A and FIG. 8B, so that the rigidity as a whole is high. The width of the protrusions 522 is about 1 mm, and the distance of multiple protrusions to be disposed is preferably about 1 mm or more and 5 mm or less in consideration of formability. With such a configuration, even under a great negative pressure state at the time of choke suction, complete crushing is prevented as illustrated in FIG. 9D, and there is also a reaction force for restoration, so that it is possible to easily return to the original shape. Further, since each of the protrusions prevents the inner surfaces from sticking to each other at the time of being crushed, it is possible to easily return to the original shape.

Therefore, the optimum pressure adjustment function can be exhibited immediately after ink filling.

Regarding the elastic deformation member illustrated in FIG. 8A and FIG. 8B and FIG. 10A and FIG. 10B, although the examples in which the structures, which are protrusions, are respectively disposed at symmetrical positions with respect to the center of the opening portion 425 have been explained, there is not a limitation as such. It is sufficient as long as each of them is disposed so as to increase the rigidity and disposed at a position that does not interfere with the area of the elastic deformation portion 423.

As described above, according to the present embodiment, it is possible to stably adjust the pressure inside the liquid ejection head. Specifically, in the present embodiment, the area between the elastic deformation portion 423 and the support portion 424 is configured with the semi-deformation portion 429 which has higher rigidity than the elastic deformation portion 423. Therefore, the elastic deformation member 421 does not get completely crushed even under a great negative pressure state such as at the time of choke suction, for example, and there is also a reaction force for restoration, so that it is possible to easily return to the original shape. Therefore, it is possible to stably adjust the pressure inside the liquid ejection head.

Second Embodiment

Figure 11:
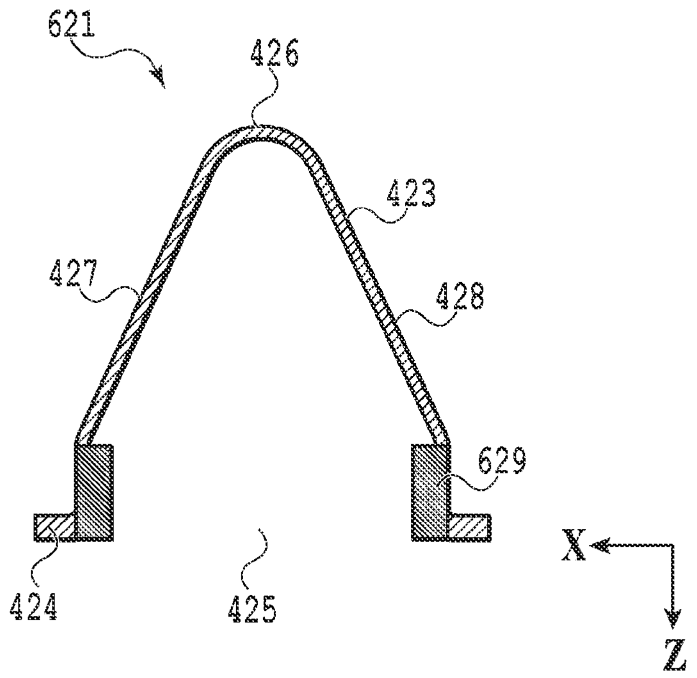
FIG. 11 is a diagram illustrating the configuration of an elastic deformation member.

FIG. 11 is a diagram illustrating the elastic deformation member 621 in the second embodiment. Since the top view is the same as the example explained in FIG. 5A of the first embodiment, the illustration is omitted. In FIG. 11, a cross-sectional view taken at the same position as in FIG. 5B is illustrated.

The elastic deformation member 621 has the elastic deformation portion 423, the support portion 424 for supporting the elastic deformation portion 423 on the liquid reservoir portion 301, and the thick portion 629 that continuously connects the elastic deformation portion 423 and the support portion 424. In the elastic deformation member 621, the configurations of the leading end portion 426, the flat surfaces 427 and 428, and the support portion 424 are equivalent to those of the elastic deformation member 421 of the first embodiment, and thus the explanations thereof are omitted. A diagram of the elastic deformation member 621 viewed from a position shifted by 90 degrees would be equivalent to the diagram illustrated in FIG. 6B.

The thick portion 629 has a curved surface extending from the opening portion 425 in a circular shape toward the leading end portion 426. That is, the thick portion 629 has a curved surface that forms a part of the outer rim portion of the cylindrical tube. The thick portion 629 is thicker and has higher rigidity than the elastic deformation portion 423. The thick portion 629 is disposed so as not to interfere with the area of the elastic deformation portion 423 (the area of the flat surfaces 427 and 428) since the pressure adjustment function is deteriorated by such interference. The thick portion 629 is configured to be thick inward from the inner wall of the elastic deformation portion 423. In other words, the thick portion 629 is configured so that the inner side of the elastic deformation member 621 is thickened. If the thick portion 629 were configured to be thick outward, the support portion 424 would also be offset outward, which results in an increase in the outer shape and the size of the liquid ejection head. Therefore, it is preferable that the thick portion 629 is configured so as to be thick inward from the inner wall of the elastic deformation portion 423.

It is preferable that the thickness of the thick portion 629 is configured to be about two times or more and five times or less than the thickness of the elastic deformation portion 423. The elastic deformation portion 423 of the elastic deformation member 621 is configured with a small thickness because of the need for sensitivity to adjust minute pressure fluctuations caused by the movement of the carriage 110. Therefore, it gets completely crushed under a greatly depressurized state at the time of choke suction. Since the thick portion 629 of the present embodiment is an area with high rigidity that is thick inward, complete crushing is prevented as illustrated in FIG. 9D, and there is also a reaction force for restoration, so that it is possible to easily return to the original shape.

Third Embodiment

Figure 12:
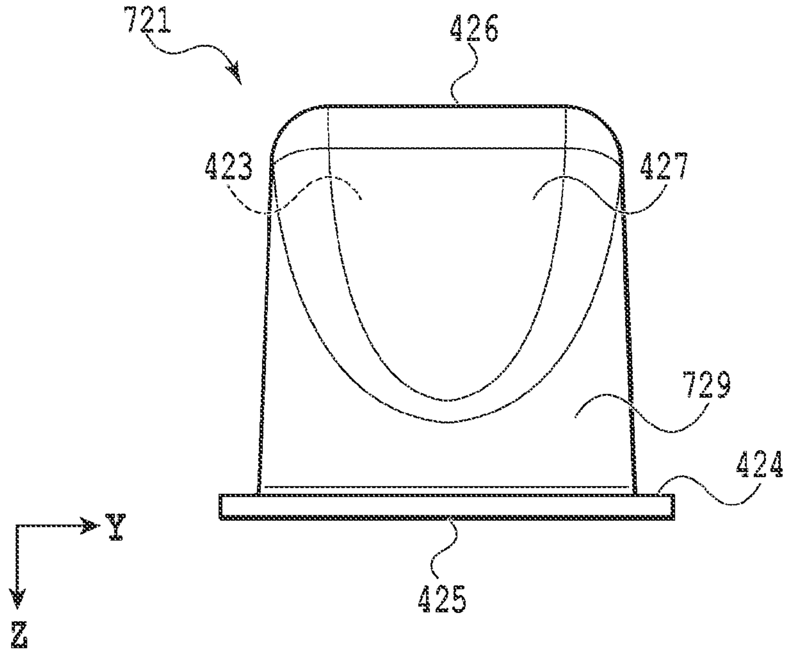
FIG. 12 is a diagram illustrating the configuration of an elastic deformation member.

FIG. 12 is a diagram illustrating the configuration of the elastic deformation member 721 according to the third embodiment. The top view is the same as the example explained in FIG. 5A of the first embodiment. FIG. 12 is a diagram illustrating the outer appearance of the elastic deformation member 721 viewed from the same position as in FIG. 6B.

The elastic deformation member 721 has the elastic deformation portion 423, the support portion 424 for supporting the elastic deformation portion 423 on the liquid reservoir portion 301, and the non-deformation portion 729 that continuously connects the elastic deformation portion 423 and the support portion 424. In the elastic deformation member 721, the configurations of the leading end portion 426, the flat surfaces 427 and 428, and the support portion 424 are equivalent to those of the elastic deformation member 421 of the first embodiment, and thus the explanations thereof are omitted.

The non-deformation portion 729 has a curved surface extending from the opening portion 725 in a circular shape toward the leading end portion 726. That is, the non-deformation portion 729 has a curved surface that forms the outer rim portion of the cylindrical tube. The non-deformation portion 729 has higher rigidity than the elastic deformation portion 423. The non-deformation portion 729 and the elastic deformation portion 423 may be made of different materials. For example, it is preferable that the non-deformation portion 729 is configured of epoxy resin, PP (polypropylene), or the like, and the elastic deformation portion 423 is formed of a rubber material or elastomer. If the elastic deformation portion 723 is elastomer, the non-deformation portion 729 and the elastic deformation portion 423 can be manufactured by two-color molding or the like, and, even with different materials, they can be provided at low costs. Furthermore, in the present embodiment, it is preferable that the elastic deformation portion 723 is configured to have only the minimum area required for the pressure adjusting function. Regarding the elastic deformation member 721 of the present embodiment, since the non-deformation portion 729 has higher rigidity than the elastic deformation portion 423, complete crushing is prevented as illustrated in FIG. 9D, and there is also a reaction force for restoration, so that it is possible to easily return to the original shape.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-127254, filed Aug. 9, 2022, which is hereby incorporated by reference herein in its entirety.

What is claimed is:

1. A liquid ejection head including an ejection port configured to eject liquid, a liquid reservoir configured to supply the liquid to the ejection port, and a pressure adjustment unit configured to adjust a pressure of the liquid reservoir, wherein the pressure adjustment unit includes:

a pressure adjustment chamber communicating with the liquid reservoir, an elastic deformation portion configured so that an inner volume thereof can be changed according to a pressure inside the pressure adjustment chamber, and a support portion configured to support the elastic deformation portion on the liquid reservoir portion, wherein an area at which the elastic deformation portion and the support portion are connected has higher rigidity than that of the elastic deformation portion, wherein the support portion includes an opening communicating with the liquid reservoir, and wherein the pressure adjustment chamber has a structure which is symmetrical about the opening.

2. The liquid ejection head according to claim 1, wherein, in the area at which the elastic deformation portion and the support portion are connected, a structure protruding from an inner wall of the area toward an inside of the pressure adjustment chamber is disposed.

3. The liquid ejection head according to claim 2, wherein, as the structure, a plurality of structures are disposed.

4. The liquid ejection head according to claim 3, wherein the structures are disposed so as to be symmetrical about the opening.

5. The liquid ejection head according to claim 2, wherein a width of the structure on a plane parallel to a plane on which the opening is formed is longer at a first position than at a second position, the first position being closer to the opening, and the second position being further away from the opening.

6. The liquid ejection head according to claim 1, wherein a thickness of the area at which the elastic deformation portion and the support portion are connected is thicker than the elastic deformation portion.

7. The liquid ejection head according to claim 6, wherein the thickness of the area at which the elastic deformation portion and the support portion are connected becomes thicker from an inner wall of the elastic deformation portion toward an inside of the pressure adjustment chamber.

8. The liquid ejection head according to claim 1, wherein the area at which the elastic deformation portion and the support portion are connected corresponds to a non-deformable area.

9. The liquid ejection head according to claim 8, wherein the area at which the elastic deformation portion and the support portion are connected is made of a material different from the elastic deformation portion.

10. The liquid ejection head according to claim 8, wherein the non-deformable area is configured by two-color molding with the elastic deformation portion.

11. The liquid ejection head according to claim 1, wherein the pressure adjustment chamber includes an opening portion in a circular shape and two surfaces that are flat in a state before deformation on an outer peripheral surface, and a distance between the two surfaces becomes smaller toward a leading end portion, which is on an opposite side of the opening portion.

12. A liquid ejection apparatus comprising:

a liquid ejection head including an ejection port configured to eject liquid, a liquid reservoir configured to supply the liquid to the ejection port, and a pressure adjustment unit configured to adjust a pressure of the liquid reservoir;

a tank configured to store the liquid to be supplied to the liquid ejection head; and a tube configured to connect the liquid ejection head and the tank, wherein the pressure adjustment unit includes:

a pressure adjustment chamber communicating with the liquid reservoir, an elastic deformation portion configured so that an inner volume thereof can be changed according to a pressure inside the pressure adjustment chamber, and a support portion configured to support the elastic deformation portion on the liquid reservoir portion, wherein an area at which the elastic deformation portion and the support portion are connected has higher rigidity than that of the elastic deformation portion, wherein the support portion includes an opening communicating with the liquid reservoir, and wherein the pressure adjustment chamber has a structure which is symmetrical about the opening.

13. The liquid ejection apparatus according to claim 12, wherein the liquid ejection head ejects the liquid while performing reciprocal movement.

14. The liquid ejection apparatus according to claim 12, further comprising:

a cap configured to cover the liquid ejection head; and a pump configured to suction the liquid ejection head in a state in which the liquid ejection head is covered with the cap.

* * * * *